A. CARPENTER & C. C. KISSELLE.
CUSHIONING DEVICE FOR VEHICLES.
APPLICATION FILED OCT. 2, 1908.
912,989.
Patented Feb. 23, 1909.
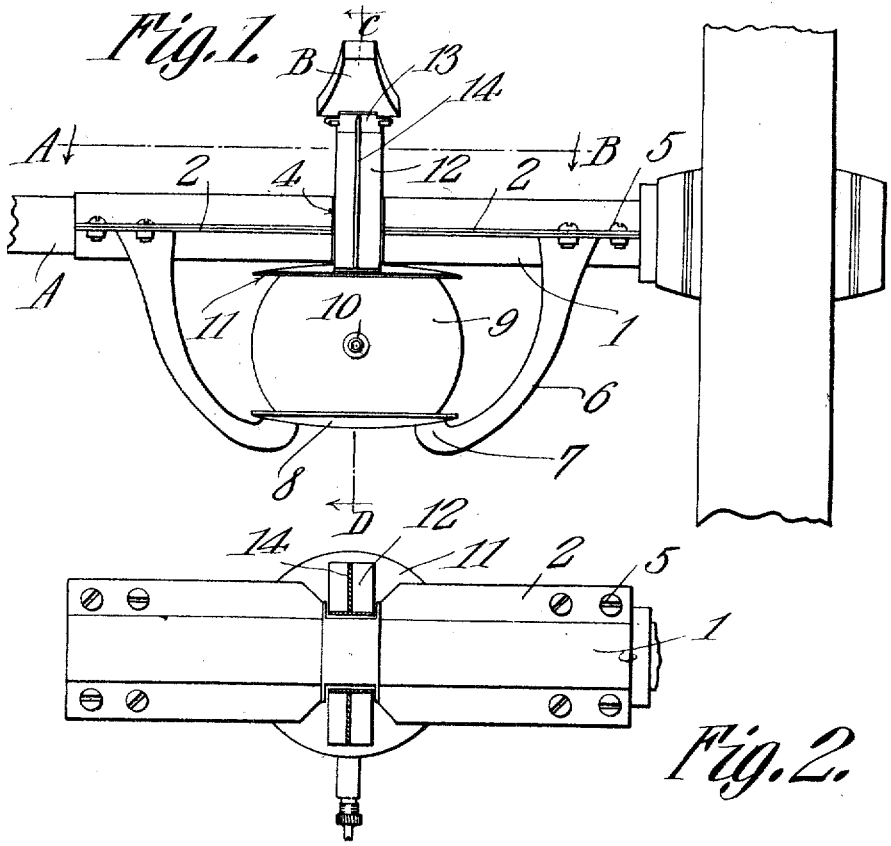
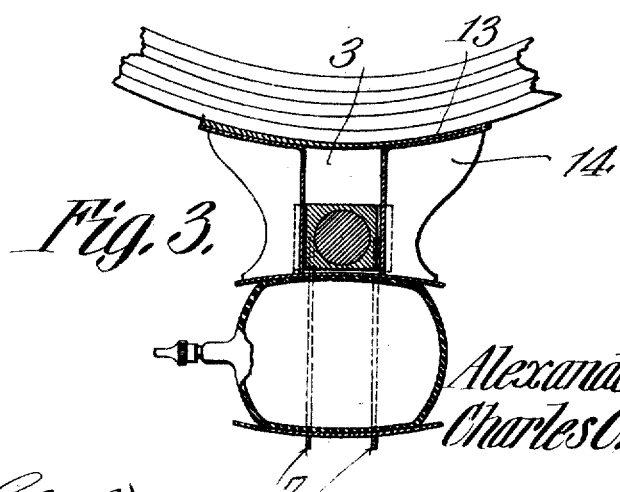
Alexander Carpenter and
Charles C. Kisselle
INVENTORS.

UNITED STATES PATENT OFFICE.

ALEXANDER CARPENTER AND CHARLES C. KISSELLE, OF FINDLAY, OHIO.

CUSHIONING DEVICE FOR VEHICLES.

No. 912,989.     Specification of Letters Patent.     Patented Feb. 23, 1909.

Application filed October 2, 1908. Serial No. 455,841.

*To all whom it may concern:*

Be it known that we, ALEXANDER CARPENTER and CHARLES C. KISSELLE, citizens of the United States, residing at Findlay, in the county of Hancock and State of Ohio, have invented a new and useful Cushioning Device for Vehicles, of which the following is a specification.

This invention relates to pneumatic springs for use in connection with vehicles, and it is more particularly an improvement upon the structure shown in an application for United States Patent filed by us on October 30th, 1907, said application bearing Serial No. 399,897, and upon the structure shown in an application filed by us on May 7th, 1908, Serial No. 431,432.

The object of the invention is to provide a pneumatic spring having means of novel construction for supporting it below the axle of the vehicle to which the spring is attached.

A further object of the invention is to provide a spring-engaging member movably mounted relative to the support of the spring cushion and having guides whereby displacement of said member relative to the pneumatic spring is prevented.

A still further object is to provide a pneumatic spring of this character which can be readily placed in position upon the axle of a vehicle.

With the above and other objects in view the invention consists of certain novel details of construction and combinations of parts hereinafter more fully described and pointed out in the claims.

In the accompanying drawings the preferred form of the invention has been shown.

In said drawings:—Figure 1 is a front elevation of a spring embodying the present improvements, said spring being shown in position upon a vehicle axle. Fig. 2 is a section on line "A—B" Fig. 1. Fig. 3 is a section on line "C—D" Fig. 1.

Referring to the figures by characters of reference, "A" designates the axle of a vehicle, the same being designed to extend through an elongated cylindrical sleeve 1 having oppositely disposed longitudinal flanges 2 thereon. These flanges extend in opposite directions from a central rectangular collar 3 the front and rear, or bearing faces of which are provided with parallel guide flanges 4. Although the sleeve 1 is preferably formed in one piece, the same may, if desired, be split into two sections at each end, each of the sections being provided with flanges 2 designed to be secured together by means of bolts or other devices such as indicated at 5 in the drawings.

Oppositely disposed pairs of downwardly converging hangers 6 are formed with or secured to the lower flanges 2 of the device close to the ends of the sleeve 1. The lower ends of these hangers are curved upwardly as indicated at 7 and are secured in any preferred manner to the lower or convex face of a concavo-convex supporting disk 8. It is of course to be understood that if preferred these hangers may be cast or otherwise formed integral with the supporting disk 8.

An inflatable sphere 9 is mounted on the disk 8 and is provided with a valve 10 whereby air may be retained within the sphere under pressure. This sphere supports a concavo-convex cap 11 on which are mounted spaced parallel standards 12. Said standards are arranged at opposite sides of the collar 3 and are designed to slide between the flanges 4.

A bowed top plate 13 is secured upon the standards and interposed between the end portions of the top plate and the standards 12 and the cap 11 are reinforced webs 14. The plate 13 constitutes a bearing for a vehicle spring "B" which may be secured thereto in any preferred manner.

The device herein described is designed to be placed upon the market as an article of manufacture. When it is desired to place the device upon an axle said axle is inserted through the sleeve 1 and if the sleeve is made up of sections the same can be tightened upon the axle by means of bolts or screws 5. The hangers 6 will therefore extend downwardly below the axle while the standards 12 will be positioned in front of and back of the axle respectively. The vehicle springs can be attached to the top strip or plate 13 and the sphere 9 after being placed loosely between the supporting disk 8 and the cap 11, can be inflated so as to hold the cap normally in contact with the angular collar 3.

Should the axle 1 be suddenly elevated, as when one or more of the wheels are passing over an obstruction, the collar 8 will be moved therewith between the standards 12 and the inflated sphere 9 will become compressed between the disk 8 and the cap 11. All sudden severe jolts of the axle will thus be absorbed or taken up, thus leaving the springs "B" to serve as supplemental cushioning devices.

Importance is attached to the fact that this device can be readily attached to axles of different constructions, and without requiring any particular form of axle. It will also be noted that the inflatable sphere 9 can be readily placed in or removed from positions between the two concavo-convex members 8 and 11, and, by reason of the peculiar contour of these members, the inflatable sphere is properly centered at all times without the necessity of utilizing any means for projecting into the same.

Obviously various changes may be made in the construction and arrangement of the parts without departing from the spirit or sacrificing the advantages of the invention.

What is claimed is:—

1. A spring for vehicles comprising a compressible axle-receiving sleeve having an intermediate angular collar, a guide device slidably mounted upon each side of the collar, a concavo-convex supporting member below and rigidly connected to the sleeve, said member being disposed under the collar, a concavo-convex cap arranged over said supporting member and connected to the guide devices, and an inflatable cushioning device interposed between and seated in the concave faces of the supporting member and cap, said cushioning device being held against displacement when inflated by the supporting member and cap.

2. A spring for vehicles comprising a contractible axle-receiving sleeve having an intermediate angular collar, oppositely disposed downwardly converging hangers upon the sleeve and at opposite sides of the collar, a concavo-convex supporting member mounted upon the hangers and under the collar, guide devices slidably mounted upon the collar, means for attaching said devices to a vehicle spring, a concavo-convex cap connected to the guide devices and disposed over the supporting member, and an inflatable, spherical cushioning device interposed between and seated in the concave faces of the supporting member and the cap.

In testimony that we claim the foregoing as our own, we have hereto affixed our signatures in the presence of two witnesses.

ALEXANDER CARPENTER.
CHARLES C. KISSELLE.

Witnesses:
 M. B. SMITH,
 J. A. SMITH.